United States Patent
Ermann et al.

(12)

(10) Patent No.: US 9,100,729 B2
(45) Date of Patent: Aug. 4, 2015

(54) METHOD FOR HANDLING A TELECOMMUNICATIONS CONNECTION, TELECOMMUNICATIONS ARRANGEMENT, SWITCHING DEVICE AND NETWORK COUPLING DEVICE

(75) Inventors: Berthold Ermann, Dulmen (DE);
Norbert Schonfeld, Dortmund (DE);
Jurgen Schwartze, Schwerte (DE)

(73) Assignee: Unify GmbH & Co. KG, Munich (DE)

( * ) Notice: Subject to any disclaimer, the term of this patent is extended or adjusted under 35 U.S.C. 154(b) by 0 days.

(21) Appl. No.: 14/371,532

(22) PCT Filed: Feb. 16, 2012

(86) PCT No.: PCT/EP2012/000705
§ 371 (c)(1),
(2), (4) Date: Jul. 10, 2014

(87) PCT Pub. No.: WO2013/120501
PCT Pub. Date: Aug. 22, 2013

(65) Prior Publication Data
US 2014/0369489 A1     Dec. 18, 2014

(51) Int. Cl.
*H04M 7/00* (2006.01)
*H04Q 1/45* (2006.01)
(Continued)

(52) U.S. Cl.
CPC .............. *H04Q 1/45* (2013.01); *H04L 65/1006* (2013.01); *H04L 65/1009* (2013.01); *H04L 65/1033* (2013.01); *H04L 65/1036* (2013.01); *H04L 65/1053* (2013.01); *H04L 65/1069* (2013.01); *H04M 3/4234* (2013.01); *H04M 7/006* (2013.01); *H04M 7/0093* (2013.01); *H04M 19/02* (2013.01)

(58) Field of Classification Search
USPC .......................................................... 379/230
See application file for complete search history.

(56) References Cited

U.S. PATENT DOCUMENTS 4,860,340 A * 8/1989 Suzuki et al. .................... 379/74
5,459,785 A * 10/1995 Noda ............................ 379/386
(Continued)

FOREIGN PATENT DOCUMENTS

EP        2355537 A1     8/2011

OTHER PUBLICATIONS

Written Opinion of the International Searching Authority for PCT/EP2012/000705 dated Nov. 7, 2012 (Form PCT/ISA/237).
(Continued)

*Primary Examiner* — Harry S Hong
(74) *Attorney, Agent, or Firm* — Buchanan Ingersoll & Rooney PC

(57) ABSTRACT

A method is specified for the handling of a telecommunications connection between at least two subscribers, wherein the telecommunications connection has a signalling Channel for transmission of a signalling stream and a payload Channel for the transmission of a payload stream, wherein frequency-coded Signals are transmitted in the payload stream, wherein at least one subscriber among the at least two subscribers is assigned to a network which has a switching device and a signal processing device provided separately from the switching device, and wherein the frequency-coded Signals are recognized in the signal processing device and are transmitted independently of the payload stream to the switching device. The invention also relates to a telecommunications arrangement, a switching device and a network coupling device.

20 Claims, 3 Drawing Sheets

(51) Int. Cl.
*H04M 3/42* (2006.01)
*H04L 29/06* (2006.01)
*H04M 19/02* (2006.01)

(56) References Cited

U.S. PATENT DOCUMENTS

| | | | |
|---|---|---|---|
| 2005/0232403 A1* | 10/2005 | Chen | 379/102.01 |
| 2006/0039389 A1* | 2/2006 | Burger et al. | 370/401 |
| 2006/0116121 A1* | 6/2006 | Rosado | 455/428 |
| 2007/0070976 A1 | 3/2007 | Mussman et al. | |
| 2007/0206569 A1 | 9/2007 | Silver et al. | |
| 2008/0158336 A1* | 7/2008 | Benson et al. | 348/14.08 |
| 2008/0279364 A1* | 11/2008 | Kaji et al. | 379/283 |
| 2011/0081911 A1 | 4/2011 | Silver | |

OTHER PUBLICATIONS

International Search Report for PCT/EP2012/000705 dated Nov. 7, 2012 (Forms PCT/ISA/220, PCT/ISA/210).

Rosenburg, et al., SIP:Session Initiation Protocol, http://tools.ietf.org/html/rtc3261, Jun. 2002, 1-269, The Internet Society.

International Preliminary Report on Patentability for PCT/EP2012/000705 dated Aug. 28, 2014 (Form PCT/ISA/373) (English Translation).

International Preliminary Report on Patentability for PCT/EP2012/000705 dated Aug. 28, 2014 (Form PCT/ISA/373) (German Translation).

* cited by examiner

METHOD FOR HANDLING A TELECOMMUNICATIONS CONNECTION, TELECOMMUNICATIONS ARRANGEMENT, SWITCHING DEVICE AND NETWORK COUPLING DEVICE

CROSS REFERENCE TO RELATED APPLICATIONS

This application is the United States national phase under 35 U.S.C. §371 of PCT International Patent Application No. PCT/EP2012/000705, filed on Feb. 16, 2012.

BACKGROUND OF THE INVENTION

1. Field of the Invention

Embodiments relate to methods for handling a telecommunications connection, telecommunications arrangement, a switching device, and a network coupling device, in which the telecommunications connection supports the transmission of frequency-coded signals on a payload channel.

2. Background of the Related Art

A telephone system requires an exchange like a PABX (Private Automatic Branch Exchange) to control performance features, in many cases, like the detection of user input during the call. This is particularly the case when no other data channels are available alongside the voice connection for signaling.

Prior art includes signaling user input in communications systems via DTMF signals. DTMF (Dual Tone Multi-Frequency) is a multi-frequency dialing method for which dialed numbers or buttons on a terminal are represented by combining two pure tones (sinusoidal audio signals). The pure tones are transmitted and interpreted in an exchange or the like. For a type of transmission known as outband transmission, the signals are transmitted in the signaling channel, e.g., in the D channel on ISDN. For a type of transmission known as inband transmission, the signals are transmitted in the voice channel, e.g., as tones. In this classic communications environment, two communication partners are interconnected in what is known as the switching network. By using DTMF receivers, the switching technology can decide when DTMF detection is necessary, and it can connect a suitable code receiver to the existing call via the switching network.

In the evolution to VoIP, it became advantageous to use digital signal processors (DSP). In this case, two VoIP terminals were also interconnected in the switching network. Subsequent evolutionary steps led to "direct payload negotiation" to reduce the use of digital signal processors to the extent possible, and to also allow purely software-based VoIP switching systems. In this case, in the signaling channel, the type of DTMF transmission is negotiated first, e.g., RFC2833, and then special packets are transmitted in the payload channel, e.g., RTP, which represent the DTMF signals. With VoIP solutions, however, the signaling and payload channels are often routed over different paths. This can make it so the voice channel no longer passes through the exchange (PABX). The detection of DTMF signals by the exchange is then no longer possible because only the signaling stream is routed to the PABX, but not the payload stream. Previously, the problem could only be solved by interrupting the direct voice connection to detect DTMF signals, and incorporating digital signal processors again.

Thus, the detection of DTMF signals for an exchange in the VoIP environment is often no longer possible, and performance features can no longer be provided during the call.

BRIEF SUMMARY OF THE INVENTION

One function of this invention is to transmit user input in a voice communication connection, even in a VoIP environment, such as to allow the detection of signals that represent user input in an exchange.

According to one embodiment of the invention, a method is specified for handling a telecommunications connection between at least two participants, in which the telecommunications connection has a signaling channel to transmit a signaling stream and a payload channel to transmit a payload stream, in which frequency-coded signals are transmitted in the payload stream, and in which at least one participant of the at least two participants is assigned to a network with a switching device and a signal processing device provided separately from the switching device. According to the invention, the frequency-coded signals in the payload stream are detected by the signal processing device, and transmitted to the switching device independently from the payload stream.

Thus, even in areas of IP telephony where the payload channel is not routed via the switching device, frequency-coded signals that are transmitted via the payload channel reach the switching device, and are routed there for additional processing or use. In telephony environments in which the payload channel is routed via the switching device, the forwarding to the switching device can be accelerated by selectively branching off frequency-coded signals from the payload channel.

BRIEF DESCRIPTION OF THE FIGURES

In the following, the invention is described in more detail using preferred exemplary embodiments and with the help of figures. Here

DETAILED DESCRIPTION OF THE INVENTION

Figure 1:
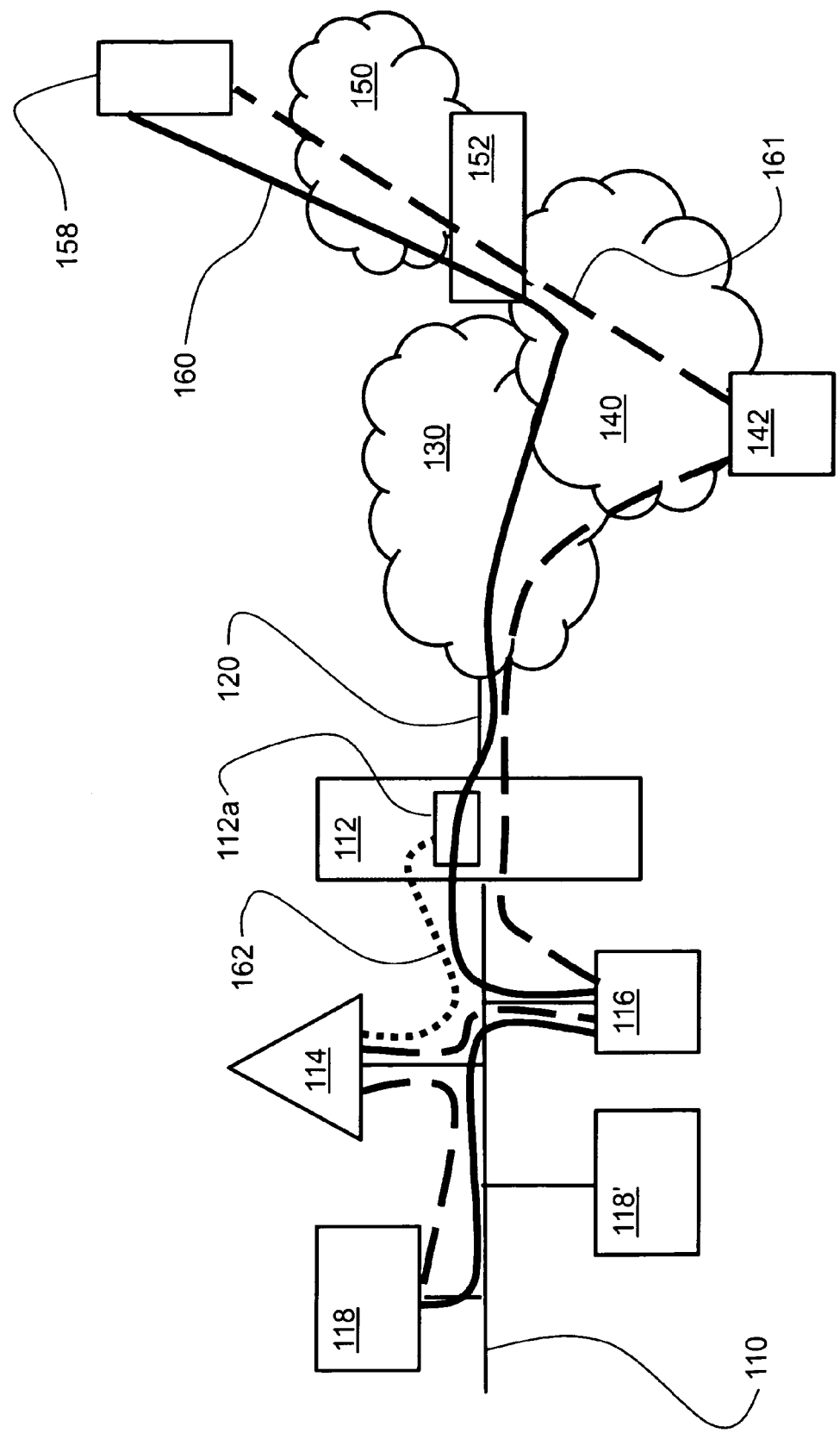
FIG. 1 is a schematic diagram of a telecommunications arrangement according to an exemplary embodiment of this invention.

Embodiments are particularly advantageous with frequency-coded signals like touch tone signals, particularly DTMF signals, that represent the user input of a participant, since these signals are often used to control performance features of the switching device. The switching device can, for example, be a telephone system like a PBX, PABX, or IP-PABX, etc., and the network can be a local network, particularly a LAN, W-LAN, etc.

Preferably, the signal processing device is a network coupling device, particularly a router or a gateway, etc., or part of a network coupling device, or connected to a network coupling device that is provided at a central location in the network. Such central locations are on the nodes between networks, where the signaling channel and the payload channel of a telecommunications connection converge.

The communication connection can be established via SIP/SDP signals transmitting in the signaling channel, and a payload stream can be transmitted via RTP signals in the payload channel. These protocols, which will be explained in further detail in relation to the exemplary embodiment, are particularly significant when the communication connection is a VoIP connection. In particular, on these types of connections, the payload channel is transmitted bypassing the switching device, while the signaling channel is advantageously routed via the switching device to use the connection parameters for initiating and handling the telecommunications connection there.

If the frequency-coded signals are removed from the downstream payload stream by the signal processing device, any interference of the voice signal at the receiver can be prevented. The downstream payload stream is considered the payload stream after flowing through the signal processing device, regardless of the side from which the connection was established. This also condenses the payload stream, and it is no longer necessary to filter out DTMF signals in the receiver device in which the RTP signals are converted to acoustic signals.

If a dedicated connection or a dedicated connection channel is established to transmit the frequency-coded signals to the switching device, interference-free and rapid forwarding can be ensured.

If, on the other hand, the frequency-coded signals are transmitted from the signal processing device via the signaling channel to the switching device, processes for establishing and handling a dedicated connection or a dedicated connection channel can be avoided.

Preferably, the signal processing device is remotely programmable, particularly via an administration interface, and the switching device uses remote programming to set a rule in the signal processing device, which enables and/or instructs the signal processing device to detect and filter out the frequency-coded signals from the payload stream.

According to another factor of the invention, a telecommunications arrangement with a switching device and a signal processing device provided separately from the switching device is proposed, in which the signal processing device is configured or remotely configurable to detect frequency-coded signals transmitted from a payload channel of a telecommunications connection, and transmit these independently from a payload stream of the telecommunications connection to the switching device. Preferably, the signal processing device is designed as a network coupling device, or in or as a component of a network coupling device.

According to another factor of the invention, a switching device of a communication network is proposed, which is configured to set a rule in a signal processing device provided separately from the switching device in the same communication network, which enables and/or instructs the signal processing device to detect frequency-coded signals that are contained in a payload stream of a telecommunications connection, and to transmit these independently from a payload stream of the telecommunications connection to the switching device.

According to another factor of the invention, a network coupling device of a communication network is proposed, which is configured or remotely configurable to detect frequency-coded signals that are contained in a payload stream of a telecommunications connection, and to transmit these independently from a payload stream of the telecommunications connection to a switching device on the same communication network.

FIG. 1 schematically shows a telecommunications arrangement according to a preferred exemplary embodiment of this invention.

According to the diagram in FIG. 1, a local area network (LAN) 110 is coupled via a router 112 to a wide area network (WAN) 120.

Along with the router 112, an IP telephone system (IP-PABX) 112), a session border controller (SBC) 116, a VoIP phone 118, and additional terminals represented by one terminal 118' are connected to the local network 110. The local network 110 can be a wired LAN or a wireless network (WLAN).

The router 112 is a coupling element on the network layer of the OSI model. It serves to connect/couple different telecommunications networks, here the LAN 110 and the WAN 120. It is thus a network coupling device for the purposes of the invention, in particular.

A private automatic branch exchange (PABX) is a local telephone system that is provided to supply a local network like an office network or a private network with telephone services. IP-PABX denotes a telephone system or private automatic branch exchange that is capable of switching connections based on the internet protocol (IP). IP is arranged on the network layer (3rd layer) of the OSI layer model, and it serves to address data packets and switch them in a packet-based network. The IP-PABX 114 is a switching device for the purposes of the invention. It can also handle other tasks in addition to the switching task. In particular, the IP-PABX 114 can also be configured to switch connections based on other protocols than IP.

The session border controller (SBC) 116 is a security component and, in general, a control unit for VoIP connections. Voice over IP (VoIP) is a technology that enables telephone services and particularly voice connections to be implemented and switched based on IP and an IP infrastructure. The job of the SBC 116 is to recognize calls within the local network 110, to authenticate and encrypt connections, and to conceal the infrastructure. The SBC 116 can thus also be designated as a VoIP control unit.

A VoIP phone is considered a telecommunications terminal that is configured for telephony via IP. Along with the VoIP phone 118, other terminals 118' can also act as VoIP phones.

The wide area network 120 consists of multiple networks, here the internet 130, a SIP environment 140 with a SIP provider 142, and a cellular network 150 that is connected to the SIP environment 140 via a gateway 152. A cellular phone 158 is shown as representative in the cellular network 150.

An embodiment of the invention is explained below in more detail using a telecommunications connection established between the cellular phone 158 and the VoIP phone 118 with a voice channel 160 and a signaling channel 161. The VoIP phone 118 and the cellular phone 158 are participants for the purposes of the invention.

The SIP environment 140 is an environment provided by an internet provider to be able to direct communication connections (i.e., sessions) via the internet. In this respect, it can be viewed as part of the internet 130.

Session initiation protocol (SIP) is a network protocol to establish, control, and end a communication session between two or more participants. The protocol is specified in RFC 3261. SIP is a frequently used protocol in IP telephony. A SIP provides like the SIP provider in 142 is a directory service to be able to find the participant on the internet. The SIP provider 142 stores an account for each participant with the phone number and user data. Call requests are referred to the actual destination on the internet using this account.

The cellular network 150 is a packet-based radio communication network in which data packets are transmitted based on a time division multiplex (TDM) method. Without limiting its universality, the cellular network 150 is a GSM network and the cellular phone 158 is a GSM cellular phone. The cellular phone 58 is also DTMF-capable (more details on this can be found below).

A telecommunications connection between the cellular phone 158 and the IP phone 118 has, as mentioned above, a voice channel 160 and a signaling channel 161. In general, the voice channel 160 is also called the payload channel, since data can also be transmitted via this voice channel 160 that does not reproduce any voice signals. Thus, SMS data, MMS data, documents, etc. can also be transmitted via the voice channel 160.

Within the SIP protocol (see above), the real time transport protocol (RTP) is used to transmit the voice signals (the payload stream). RTP is a protocol to continuously transmit audio-visual data (streams) via IP-based networks. The protocol was first standardized in 1996 in RFC 1889. A revised RFC was published in 2003. RFC 3550 then superseded RFC 1889. It serves to transport multimedia data streams (audio, video, text, etc.) via networks, i.e., coding, packetizing, and sending the data. RTP is a packet-based protocol and normally operates via UDP. The user datagram protocol (UDP) is a simple, connectionless protocol for transmitting data via the internet. UDP has a simpler structure compared to the transmission control protocol (TCP), which always established a connection between end points (sockets) of a network connection, and UDP resides on the transport layer of the OSI layer model. RTP can be used both for unicast connections as well as for multicast communication on the internet. RTP is used in many areas, including for the IP telephony technologies H.323 and SIP to transmit audio-video streams of the call. The function of RTP is primarily to transmit real-time-sensitive data streams, while protocols like the session description protocol (SDP) or the real-time streaming protocol (RTSP) control and monitor the data transmission.

The session description protocol (SDP) is described in RFC 4566. This protocol is used within the SIP protocol to negotiate the parameters of an RTP communication. The capabilities of the participating communication terminals are shared here (supported codecs, codec parameters, IP addresses, and ports).

SIP/SDP data packets are transmitted in the signaling channel 161. These packets establish and control the connection and negotiate the connection parameters. The signaling channel 161 passes through the cellular network 150, via the gateway 152, through the SIP environment 140 with the SIP provider 142, in which the address of the IP phone 118 is stored, through the internet 130, and it reaches the router 112 of the local network 110. From the router 112, the signaling data stream or signaling stream is routed via the local network 110 to the SBC 116, the IP-PABX 114, and ultimately to the IP phone 118.

The voice channel 60 contains the voice data that is obtained from the voice information of a user of the cellular phone 158 using a method not described in detail here, and split into RTP data packets. The voice channel passes through the cellular network 150, via the gateway 152, bypassing the SIP provider 142 through the SIP environment 140 and the internet 130, and reaches the router 112 of the local network 110. From the router 112, the voice data stream or payload stream is routed via the local network 110 to the SBC 116, and from there, bypassing the IP-PABX 114, it is routed directly to the IP phone 118.

Bypassing both the SIP provider 142 and the telephone system (IP-PABX) 114 of the local network 110 is a property of IP telephony.

The telephone system (IP-PABX) 114 is configured to control performance features for the connections and terminals 118, 118' connected to it. Without limiting universality, these performance features can include: toggling, partner function or boss/secretary function, night answer service, call back, call waiting, intrusion, conferencing, retrieve, call forwarding, call transfer, hold music, CAPI functions, voice menu, etc.

Some, but not necessarily all, of the performance features can be initiated by another external participant. The DTMF method is utilized to do this in a manner known per se, which is described in more detail below using the diagram in FIG. 2. The cellular phone 158 is this type of external participant.

Figure 2:
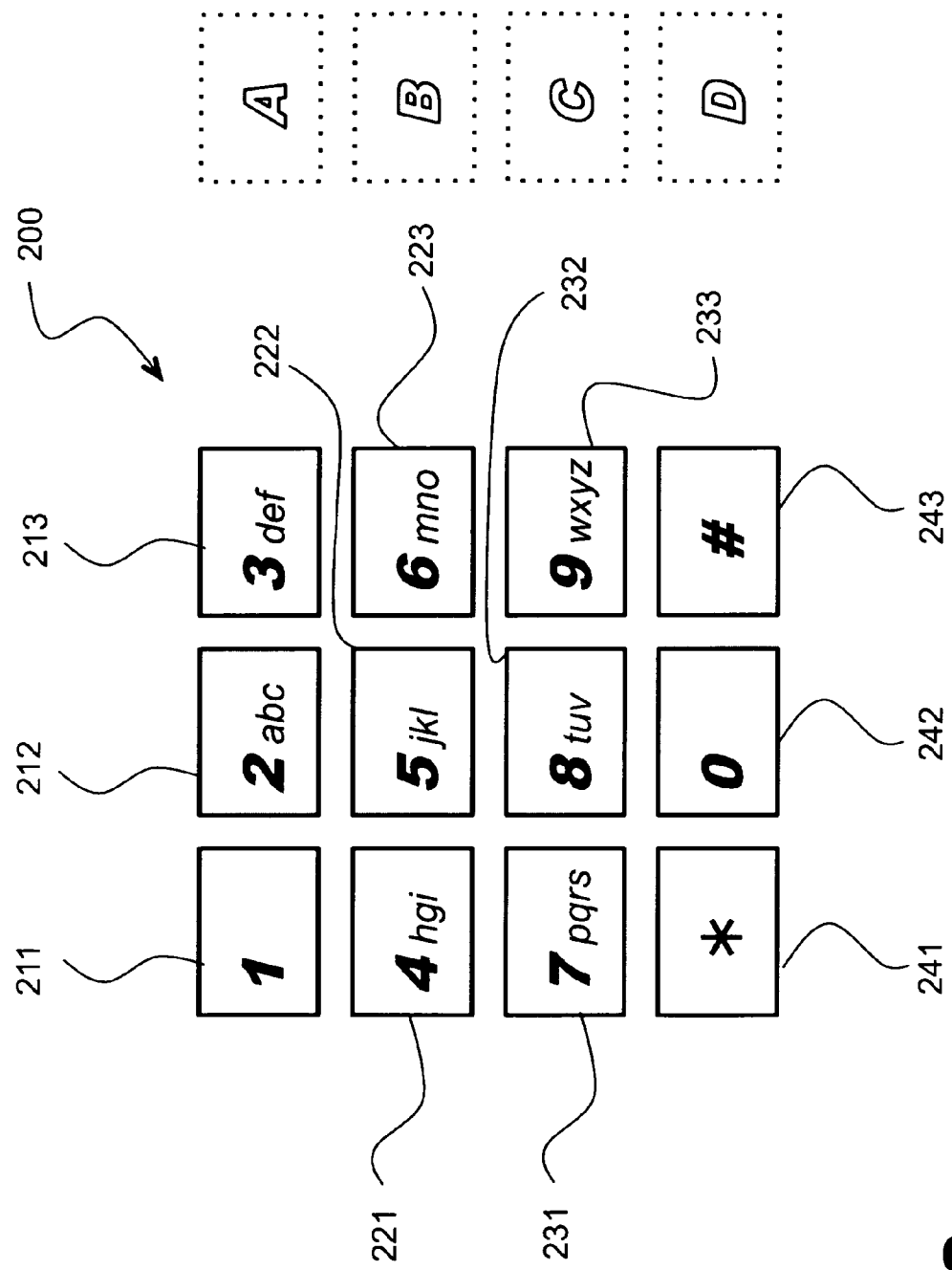
FIG. 2 is a schematic diagram of a keypad.

FIG. 2 is a schematic diagram of a layout of a conventional keypad 200 of a DMTF-capable phone. The cellular phone 158 has a keyboard with this type of keypad 200.

The keypad 200 has twelve keys 211, 212, 213, 221, 222, 223, 231, 232, 233, 241, 242, 243. In the reference numbers for the keys, the second digit indicates the line and the third digit indicates the column on the keypad 200 according to the diagram in FIG. 2. According to the diagram in FIG. 2, the key 211 is assigned the number "1," the key 212 the number "2," the key 213 the number "3," the key 221 the number "4," the key 222 the number "5," the key 223 the number "6," the key 231 the number "7," the key 232 the number "8," the key 233 the number "9," the key 241 the symbol "*," the key 242 the number "0," and the key 243 the symbol "#." The keys 212 through 232, which represent the numbers "2" through "9," are also used to code the letters a through z, in which one key is used for a group of three or four letters. This assignment is also shown in FIG. 2.

On some keypads that are no longer common, next to the three columns described above, there is a fourth column of keys representing the letters "A," "B," "C," and "D." These keys are shown with dotted lines in FIG. 2 for the sake of completeness, but are not otherwise specified.

For the dual tone multi-frequency method, every dialed number or key 211 through 243 represents a dial signal, which is represented by a combination of two sinusoidal audio signals that can be detected by an exchange. The assignment of the frequencies according to the applicable standard can be seen in Table 1 below. Here, keys 211 through 243 are represented by the number or symbol assigned to them.

TABLE 1

| Row: | Column:<br>Frequency: | 1<br>1209 Hz | 2<br>1336 Hz | 3<br>1477 Hz | 4<br>1633 Hz |
|---|---|---|---|---|---|
| 1 | 697 Hz | "1" | "2" | "3" | ("A") |
| 2 | 770 Hz | "4" | "5" | "6" | ("B") |
| 3 | 852 Hz | "7" | "8" | "9" | ("C") |
| 4 | 941 Hz | "*" | "0" | "#" | ("A") |

As shown in Table 1, each line represents a comparatively low frequency, i.e., a low note, and each column represents a comparatively high frequency, i.e., a high note. When a key is pressed, the low note of the respective line and the high note of the respective column are generated using two sinusoidal oscillators for the column and line frequency. The resulting mixed tone is transmitted as an audio signal, which is called a DTMF signal, via the voice channel or payload channel 160 (see FIG. 1) of a telephone connection. The DTMF signals are frequency-coded signals for the purposes of the invention.

The Goertzel algorithm is generally used to detect the frequencies. This detects individual audio frequencies or spectral components based on the discrete Fourier transform. The basic principles of the Goertzel algorithm can be found in American Math. Monthly, Vol. 65, 1958, pages 34 to 35. A detailed overview can be found in the entry at www.wikipedia.org.

As already mentioned, in a VoIP environment as shown in FIG. 1, the payload channel 160 and the signaling channel 161 are transmitted on separate routes. Since the payload channel 161 transmitting the DTMF signals in a VoIP environment is routed directly to the participant bypassing the telephone system (IP-PABX), the DTMF signals on this route cannot reach the IP-PABX 114 and be analyzed there.

According to the diagram in FIG. 1, the router 112 has an administration interface 112a. The administration interface 112a of the router 112 can be used to define how DTMF signals are identified in the payload stream 160 and how the identified DTMF signals are transmitted via a branch channel 162 via the local network 110 to the IP-PABX 114.

The rerouted DTMF signals are then received by a DTMF receiver of the IP-PABX 114, and preprocessed according to a signaling negotiation and forwarded to the switching technology. This then controls the performance features based on the received DTMF signals.

It should be noted that the router 112 only determines that or whether UDP or RTP packets are DTMF signals. The router 112 does not have to determine which DTMF signals they are. For the identification in the router 112, it can be advantageous to use the fact that RTP packets that contain DTMF signals are labeled as such in the RTP coding process, e.g., by specifying an attribute in the header. For example, specifying "RTP 98" in the header of an RTP packet indicates that it is an RTP packet with DTMF signals. Therefore, the identification process in the router 112 can be simpler in design that a detection process on the basis of the signaling according to e.g. RFC 2833 or a comparable algorithm, which is implemented in the IP-PABX 114 to detect DTMF signals.

The RTP packets (DTMF signals) identified by the router 112 and transmitted to the IP-PABX 114 can remain in the payload stream. In a variation, these packets (DTMF signals) are removed from the RTF stream in the payload channel 160 downstream from the router 112 (based on the transmission direction of the payload stream).

Additional details of the invention are described using a detailed diagram of the IP-PABX 114 and the router 112.

Figure 3:
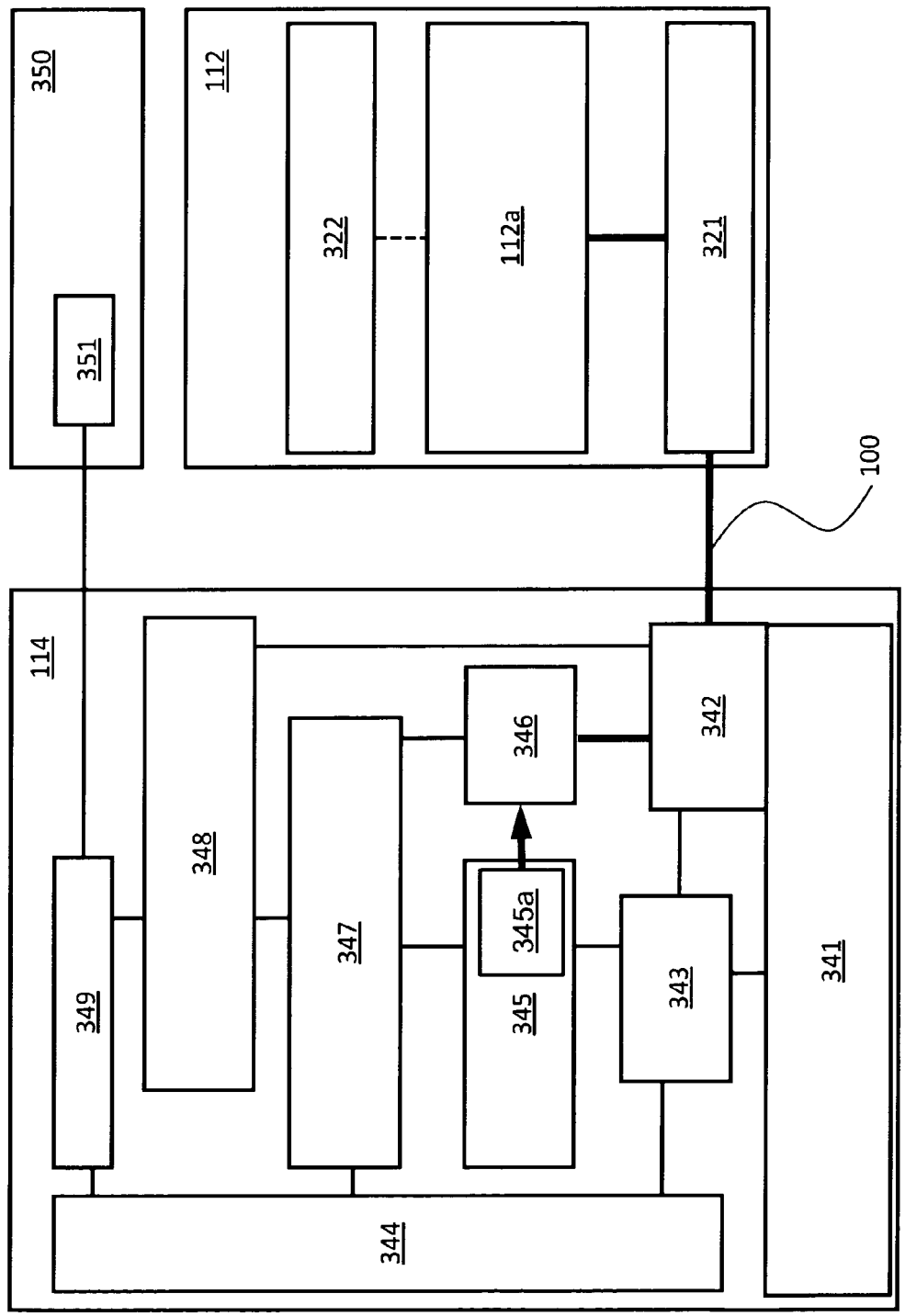
FIG. 3 is a schematic block diagram of an IP-PABX and a router from FIG. 1 with a feature process.

FIG. 3 is a schematic block diagram of the IP-PABX 114 and the router 112 in the local network 100. It is recognized that the diagram in FIG. 3 is limited to those elements of the specified devices that can be helpful for understanding the invention. It is also recognized that the exact arrangement and mode of operation of the elements depicted are solely for illustrative purposes and do not have to be exactly as shown.

According to the diagram in FIG. 3, along with the previously described administration interface 112a, the router 112 has a socket interface 321 and a memory area 322. A socket represents an end point for network communication. The router 112 has a secure remote programming environment like ssh (secure shell, a secure interface to the command line interpretation), with which the router 112 can be controlled or remotely programmed from remote instances using the administration interface 112a. The socket interface 321 is a programming interface for TCP/IP networks, i.e., it defines a series of software functions (routines) that programmers can use to develop applications for TCP/IP networks. The tasks that fall to a socket interface include generating and configuring the socket, transmitting data through the socket, receiving data from a socket, and using the socket within server programs. The socket interface 321 is the interface to the local network 100, and it is connected to the memory area 322. The memory area 322 is where IP tables are stored, for example. The administration interface 112a accesses the memory area 322, and it is connected via the socket interface 321.

As also shown in FIG. 3, the IP-PABX 114 has an operating kernel 341, a socket interface 342, a SIP area 343, an endpoint registration handler (ERH) 344, a SIP provider proxy (SPP) 345, a software RTP-DTMF receiver 346, a LAN leg controller (LLC) 347, an IP network controller (IPNC) 348, and a system interface 349.

The operating kernel 341 is on the level of the operating system of the IP-PABX 114, and it is Linux-based. The figure shows connections to the socket interface 342 and the SIP area 343. The operating kernel 341 is actually the basis of all of the processes in the IP-PABX 114.

The socket interface 342 is the interface to the local network 100, and it has the function according to the description above for the socket interface 321 of the router 112. In the context of the invention, the connection to the DTMF receiver 346 is of particular interest.

The SIP area 343 represents an area for agreeing upon and negotiating communication modalities based on the session initiation protocol (SIP). It is connected to the operating kernel 341, the endpoint registration handler (ERH) 344, and the SIP provider proxy 345.

The ERH 344 is an area for handling end point registrations. An end point is an addressable node representing a communication instance in a communication network, and it can be a SIP end point or a proxy end point. A SIP end point is used to represent users, devices, or services that can be included in activities via IP networks. They are identified by their SIP-URI (URI: uniform resource identifier or source address), which can take the form "sip: user@company.com". Proxy end points are used to represent a public switched telephone network (PSTN) telephone in the context of call remote control or communication between computer and phone. Proxy end points are identified by a SIP-URI and a TEL-URI. The TEL-URI can take the form "tel: +49891 234567890" and the SIP-URI can take the form sip: +49891234567890@cstaDomain. This means the URIs of a proxy end point can take the form of an international telephone number, and the domains are based on the computer supported telecommunications application (CSTA) domains. To specify a remote proxy end point in a session from computer to telephone, only the SIP-URI is required. The TEL-URI is also required to generate a local proxy end point. The ERH 344 is connected to the SIP area 343, the LLC 347, and the system interface 349, in particular.

The SIP provider proxy (SPP) 345 acts as a user agent in the SIP communication; it generates, sends, and manages the requests and responses based on the SIP, in particular. The SPP 345 is also capable of interpreting SDP data embedded in the SIP stream. The SPP 345 is connected to the SIP area 343, the LLC 347, and the DTMF receiver 346.

The DTMF receiver 346 receives and decrypts DTMF signals. The decryption of DTMF signals was already described. The DTMF receiver 346 is connected to the socket interface 342, the SIP provider proxy 345, and the LLC 347.

The LAN leg controller (LLC) 347 is an area for controlling a LAN branch. It is connected to the ERH 346, the SPP 348, the DTMF receiver 346, and the IPNC 348. The internet protocol network controller (IPNC) 348 is included for certain control tasks in the IP network, like bridging between wired and wireless segments of the network, among other things. It is connected to the LLC 347, the DTMF receiver 346, and the system interface 349.

The system interface 349 is an interface that enabled a connection to peripheral devices, for example. The system interface 349 can be a serial or parallel, a wired or wireless interface, based on standards like SCSI, USB, FireWire, etc. Multiple different system interfaces can be present. The system interface 349 is internally connected to the ERH 344 and the IPNC 348, in particular.

As also shown in FIG. 3, a feature process 350 is connected via a dedicated system interface 351 to the system interface 349 of the IP-PABX 114. The feature process 350 is an area for controlling performance features.

When establishing a connection between the cellular phone 158 and the VoIP phone 118 (see FIG. 1), the requests and responses for establishing the connection are exchanged via the signaling channel 161 according to the SIP protocol. On the IP-PABX 114 side, received SIP data streams are routed from the local network 100 via the socket interface 342 to the SIP area 343, and vice versa, SIP data generated in the SIP area 343 is routed via the socket interface 342 to the local network 100.

Using parameters in the SIP and in the SDP embedded in the SIP (for more on this, see the protocol explanations above), the feature process 350 decides whether the telecommunications connection could make it necessary to receive DTMF signals. To this purpose, the SPP 345 stores the information necessary for the DTMF detection. The decision can be made, for example, based on a parameter in the SDP stream that specifies that the external terminal (the cellular phone 158 in FIG. 1) is a DTMF-capable terminal. The decision can also be made based on a parameter in the SDP stream that specifies that DTMF signals for transmitting via the RTP stream are present, or based on a request sent to the external terminal (cellular phone 158) for input via the keyboard (keypad 200 in FIG. 2).

If the decision of whether the telecommunications connection could make it necessary to receive DTMF signals is made in the affirmative, the SPP 345 sets a rule 345*a* for the DTMF receiver 346 for transmitting to the router 112 via the administration interface 112*a*. To this purpose, the rule 345*a* is transmitted from the DTMF receiver 346 via the socket interface 342 and the local network 100 to the socket interface 321 of the router 112, which forwards the rule 345*a* via the administration interface 112*a*.

The rule 345*a* is activated via the administration interface 112*a* and implemented in the router 112. Using the implemented rule 345*a*, the router 112 monitors the RTP data stream received via the payload channel 160, detects specific RTP packets (DTMF signals) contained in it, copies these to a buffer area within the memory area 322, established a branch channel 162 (see FIG. 1) via the local network 100 between the router 112 and the IP-PABX 114, transmits the copied DTMF signals via the branch channel 162 to the IP-PABX 114, and deletes the transmitted DTMF signals from the buffer area. More precisely, the copied DTMF signals are transmitted via the socket interface 321 and the local network 100, received in the socket interface 342 of the IP-PABX 114, and routed to the DTMF receiver 346. Note that the branch channel 162 is independent from the payload channel 160 downstream of the router 112, and bypasses the SBC 116, i.e., it is established directly between the router 112 and the IP-PABX 114 (see FIG. 1).

In the DTMF receiver 346, the received DTMF signals are decrypted and routed to the LLC 347. The LLC 347 interprets the decrypted DTMF signals and decides thereupon to activate, to deactivate, or otherwise to control a performance feature, if necessary. If, for example, the received and decrypted DTMF signals are interpreted such that the feature process 350 should be controlled, a corresponding control signal or a control instruction is generated via the LLC 347 or the IPNC 348, which is transmitted via the system interface 349 to the system interface 351 of the feature process 350. The feature process 350 interprets the control instruction and executes an action specified therein.

In the way described above, it is also possible under VoIP conditions to easily control performance features of a telephone system during a call with user input from a remote terminal using DTMF signals transmitted in the payload channel. To this purpose, the DTMF signals are systematically redirected on the routing level from the direct voice channel without having to redirect the entire voice connection.

In a variation of the exemplary embodiment, the router 112 is supplied with a rule corresponding to the rule 345*a* in FIG. 3 in advance, and it decides using the data from the SIP/SDP stream and/or the RTF stream itself to apply the rule for branching the DTMF signals and transmitting them to the IP-PABX 114. The branching can also be obligatory, i.e., for all of the DTMF signals passing through the router 112 without any further decision.

In a refinement, the detected DTMF signals are converted to SDP instructions, and transmitted downstream of the router 112 via the signaling channel 161 to the IP-PABX. In this case, the DTMF signals in the SIP/SDP stream are routed via the SBC 116.

In another variation, the rule for branching the DTMF signals in implemented in the VoIP session control unit 116 instead of the router 112.

As described above, the IP telephone system (IP-PABX) 114 is a switching device for the purposes of this invention. However, the invention is not limited to an IP-PABX as the switching device.

The SBC 116 described above is not necessary in all cases. The IP phone 118 can also be connected via the local network 110 to the IP-PABX 114 in other ways, e.g., via USB, a serial or parallel connection, SCSI, or an S0 bus. Functions of the IP phone 118 can be implemented in the IP-PABX 114. It is important that the exchange (IP-PABX 114) conveys the payload channel 160 of the telecommunications connection to the IP phone 118.

The invention was illustrated using IP telephony (VoIP). However, it can be applied to other telecommunications services like fax over IP (FoIP). User details can be used via DTMF signals to control performance features of an IP fax machine.

Though today VoIP is conducted via RTP-based protocols, and this invention was described using this exemplary configuration, the invention can also be used in equal measure on other protocols, i.e., a preceding protocol like H.323, or future protocols. It is also recognized that the functionality of this invention is not limited to the exact route of the transmission paths for the signaling and payload channels outlined in the exemplary embodiment.

As described above, the cellular network 150 (GSM) is a network for the purposes of the invention. The invention can also be applied to other networks than GSM, e.g., and landline that is connected to the internet, like ISDN, or another cellular network, like UMTS, or a satellite network.

The division of the telecommunications connection between payload channel 160 and signaling channel 161 is not performed in the cellular phone 158 itself, but rather it can initially take place in the gateway 152, for example.

As previously mentioned, the router 112 is a network coupling device for the purposes of the invention. The router 112 can be replaced by a gateway or another device for coupling different networks. In reference to detecting and branching DTMF signals, the router 112, in general, is a signal processing device for the purposes of the invention that is separate from the PABX 114. The DTMF signals can be branched from the payload stream at any central point in the local network 110 that established a connection LAN/WAN. This central point can be a router, a gateway, a firewall, or an SBC. The functions of network coupling and identification of DTMF signals do not necessarily both have to be handled by one device. A signal processing device for identifying and branching DTMF signals can be represented as a part or a module of a network coupling device, or (as a separate device) connected to a network coupling device. It is particularly advantageous when a signal processing device like a router can be remotely controlled or programmed via an administration interface (ssh—secure shell, SNMP—simple network management protocol, etc.) to be able to implement a rule to branch the DTMF signals remotely through the IP-PABX 114.

The identified DTMF signals can also be directly transmitted from the router 112 to the IP-PABX 114, bypassing the local network 110. For example, the router 112 and IP-PABX 114 can be located in one cabinet or a shared housing, and connected to each other via an internal bus or a serial or parallel connecting cable, over which the branch channel 162 with the DTMF stream can be established.

According to the described exemplary embodiment, the feature process 350 is realized as a separate device or component or module that is connected via a system interface 351, 349 with the IP-PABX 114. The feature process can also be realized as an area within the IP-PABX 114.

In the exemplary embodiment described above, the operating kernel 341 of the IP-PABX 114 is Linux-based. It is recognized that other operating systems like Windows, Mac OS, DOS, UNIX, OS/2, etc. can be used in equal measure.

The elements or area that were described in relation to the router 112 or the IP-PABX 114 or the feature process 350 can be realized with hardware or software. In this respect, the connections shown in FIG. 3 in particular and described in this context can be implemented physically or with programming/data.

In summary, the invention systematically redirects frequency-coded signals like DTMF signals on the routing level from the direct voice channel without have to redirect the entire direct voice connection in the process.

Two pieces of knowledge are useful here. First, there is always a central point in a local network (LAN—local area network) that established a connection from the LAN to the external network (WAN—wide area network). This central point can, for example, be a router, an SBC (session border controller), a firewall, a gateway, etc. On this type of device, there are generally also administration interfaces (e.g., ssh—secure shell, SNMP—simple network management protocol) that can be controlled remotely. Second, the type of DTMF signaling in the RTP can be negotiated when establishing the connection in the signaling protocol. If the switching technology decides that DTMF signal detection is necessary for a call, a rule can be set in the router (network coupling device) via the administration interface that detects specific RTP packets (DTMF signals) in the voice channel and forwards them to a new destination. If desired by the switching technology, the signal can also be fully removed from the voice channel. The rerouted DTMF signals can then be received by a receiving process in a DTMF receiver, preprocessed according to the signaling negotiation, and then forwarded to the switching technology. It is recognized that the means of access to the router in the system can be configured beforehand (e.g., IP address of the router, password, etc.).

However, it must be noted that this invention is solely defined by the independent patent claims, and the above description of exemplary embodiments, variations and refinements are only provided as exemplary illustrations. Not all of the elements described above are completely necessary for the application and execution of the invention.

LIST OF REFERENCE NUMBERS

110 Local area network (LAN)
112 Router
112a Administration interface
114 Telephone system (IP-PABX)
116 VoIP session control unit (session border controller, SBC)
118 VoIP phone (terminal)
118' Terminal
120 Wide area network (WAN)
130 Internet
140 SIP environment
142 SIP provider
150 Cellular network (time division multiplex, TDM)
152 Gateway
158 Cellular phone
160 Payload channel
161 Signaling channel
162 Branch channel
200 Keypad
211-243 Keys
321 Socket interface
322 Memory area
341 Operating kernel
342 Socket interface
343 SIP area
344 Endpoint registration handler (ERH)
345 SIP provider proxy (SPP)
345a DTMF rule
346 DTMF receiver
347 LAN leg controller (LLC)
348 IP network controller (IPNC)
349 System interface (SI)
350 Feature process
351 System interface The above list of reference numbers is part of the description.

We claim:

1. A method for handling a telecommunications connection between at least a first communication terminal device and a second communication terminal device, the first communication terminal device assigned to a network having a switching device and a signal processing device that is separate from the switching device, the telecommunications connection having a signaling channel to transmit a signaling stream and a payload channel to transmit a payload stream, the method comprising:

receiving, by the signal processing device, data sent via the telecommunications connection from one of the first communication terminal device and the second communication terminal device to the other of the first communication terminal device and the second communication terminal device, the data comprising payload data sent via the payload channel;

determining, by the signal processing device, whether the payload data contains frequency-coded signals after receiving the data;

upon determining that the payload data contains frequency-coded signals, the signal processing device separating the frequency-coded signals from the payload data to transmit the frequency-coded signals to the switching device independently from a remaining portion of the payload data and transmitting that remaining portion of the payload data toward the other of the first communication terminal device and the second communication terminal device via the payload channel; and upon determining that the payload data does not contain frequency-coded signals, the signal processing device forwarding the payload data toward the other of the first communication terminal device and the second communication terminal device via the payload channel.

2. The method of claim 1, wherein the frequency-coded signals are sent from the signal processing device to the switching device via the signaling channel.

3. The method of claim 1, wherein the frequency-coded signals are sent from the signal processing device to the switching device via a dedicated connection between the signal processing device and the switching device that is separate and distinct from the telecommunications connection.

4. The method of claim 3, wherein the dedicated connection between the signal processing device and the switching device is comprised of a connecting cable extending from the signal processing device to the switching device.

5. The method of claim 4, wherein the connecting cable is a serial connecting cable or a parallel connecting cable.

6. The method of claim 3, wherein the dedicated connection between the signal processing device and the switching device is comprised of a bus.

7. The method of claim 1, comprising:
setting at least one rule in the signal processing device for detection of frequency-coded signals contained in the payload data by the switching device communicating instructions to the signal processing device; and
wherein the determining of whether frequency-coded signals are within the payload data is made by the signal processing device utilizing the at least one rule set via the switching device.

8. The method of claim 1, wherein the signal processing device is a router or a gateway.

9. The method of claim 1 wherein the signal processing device is a network coupling device and the switching device is a private branch exchange or a private automatic branch exchange and the network is a local area network.

10. The method of claim 1, wherein data transmitted via the payload channel is transmitted in accordance with Real-time Transport Protocol (RTP) and data transmitted via the signaling channel is transmitted in accordance with Session Initiation Protocol (SIP).

11. The method of claim 1, wherein the first communication terminal device is a telephone and the second communication terminal device is a telephone.

12. A communication system comprising:
a switching device;
a signal processing device that is separate from the switching device, the signal processing device communicatively connected to the switching device;
the signal processing device configured to receive data being sent from a first communication terminal device to a second communication terminal device via a telecommunications connection, the telecommunications connection comprising a signaling channel and a payload channel, the data comprising payload data sent via the payload channel,
the signal processing device configured to determine whether the payload data contains frequency-coded signals,
upon determining that the payload data contains frequency-coded signals, the signal processing device configured to separate the frequency-coded signals from the payload data to transmit the frequency-coded signals to the switching device independently from a remaining portion of the payload data and transmit that remaining portion of the payload data toward the second communication terminal device via the payload channel, and
upon determining that the payload data does not contain frequency-coded signals, the signal processing device configured to forward the payload data toward the second communication terminal device via the payload channel.

13. The system of claim 12, wherein the signal processing device is a router or a gateway.

14. The system of claim 12, wherein the signal processing device is a network coupling device and the switching device is a private branch exchange or a private automatic branch exchange.

15. The system of claim 12, wherein the payload channel is configured to facilitate transmission of data sent in accordance with Real-time Transport Protocol (RTP) and the signaling channel is configured to facilitate transmission of data sent in accordance with Session Initiation Protocol (SIP).

16. The system of claim 12, wherein the switching device is configured to set at least one rule in the signal processing device for detection of frequency-coded signals contained in the payload data by the switching device communicating instructions to the signal processing device; and
wherein the determining of whether frequency-coded signals are within the payload data is made by the signal processing device utilizing the at least one rule set via the switching device.

17. The system of claim 12, wherein the frequency-coded signals are sent from the signal processing device to the switching device via the signaling channel.

18. The system of claim 12, wherein the frequency-coded signals are sent from the signal processing device to the switching device via a dedicated connection between the signal processing device and the switching device that is separate and distinct from the telecommunications connection.

19. The system of claim 18, wherein the dedicated connection between the signal processing device and the switching device is comprised of a connecting cable extending from the signal processing device to the switching device.

20. The system of claim 19, wherein the connecting cable is a serial connecting cable or a parallel connecting cable.

* * * * *